C. W. PARKER.
MEANS FOR CONTROLLING AND REGULATING THE OPERATION OF CLUTCHES.
APPLICATION FILED DEC. 28, 1910.
1,055,071.
Patented Mar. 4, 1913.
3 SHEETS—SHEET 1.
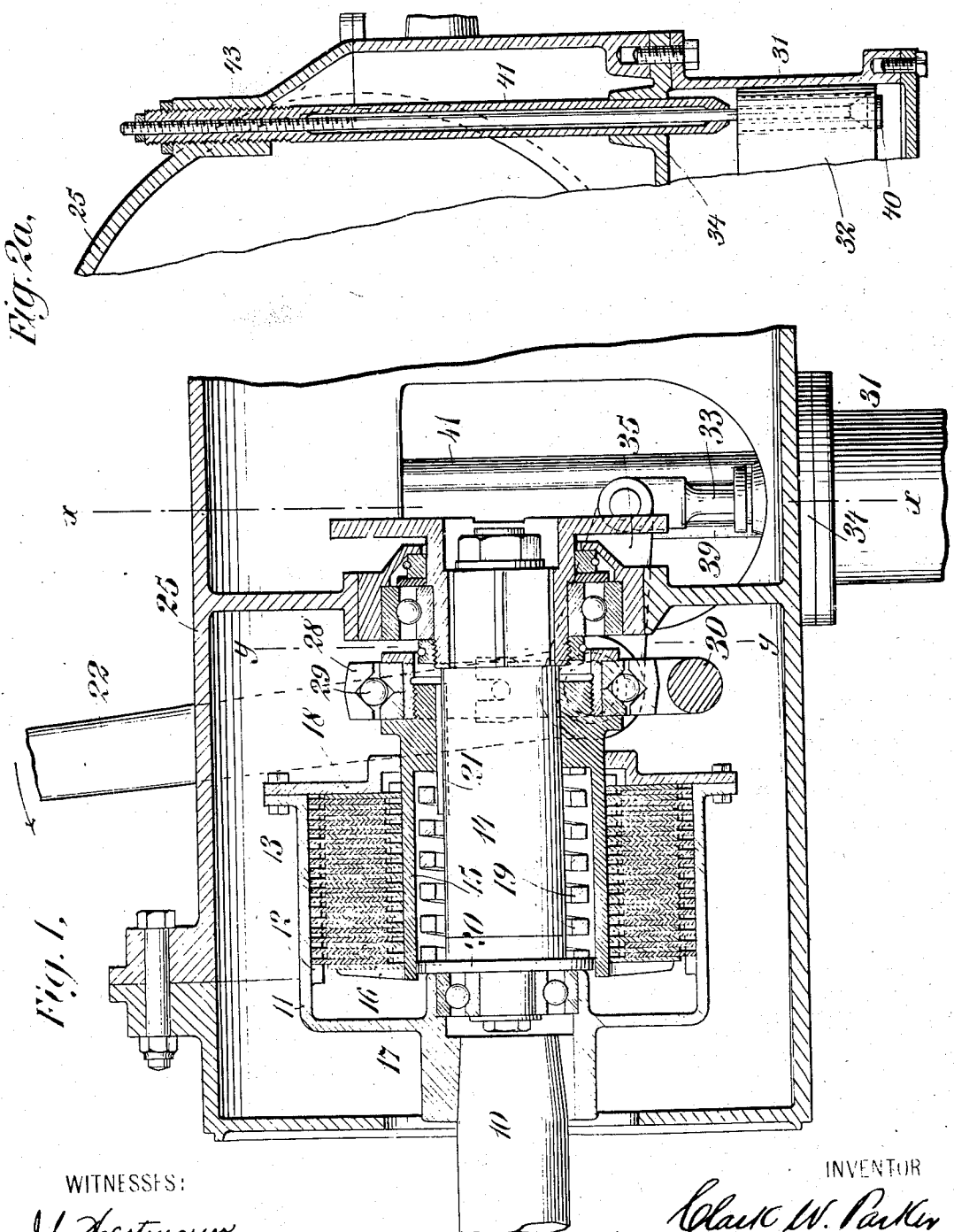
WITNESSES:
INVENTOR
Clark W. Parker
BY
his ATTORNEYS

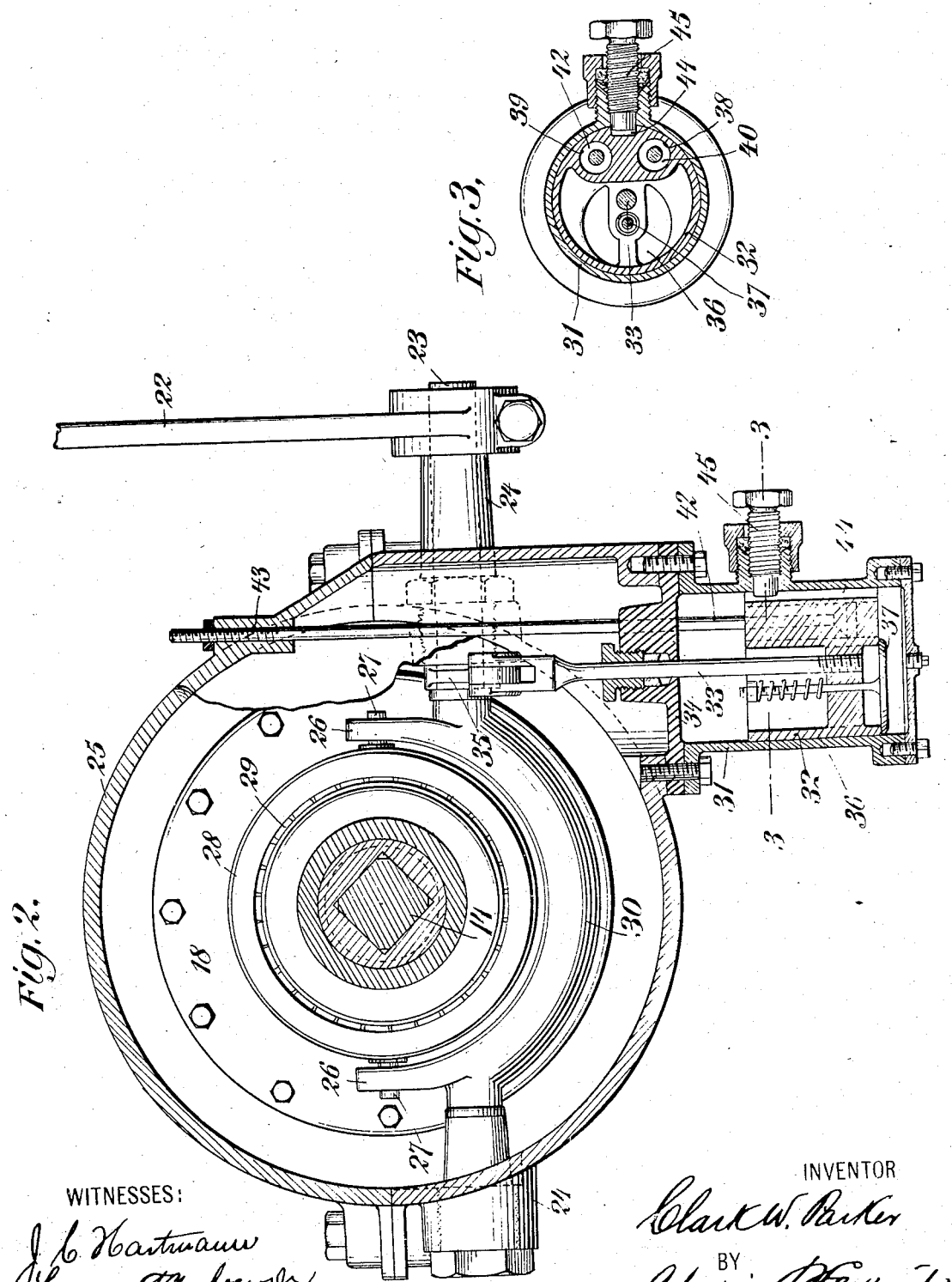

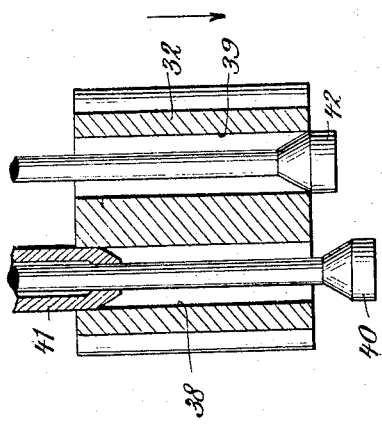
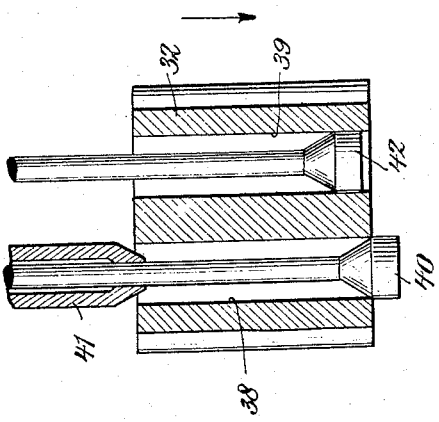
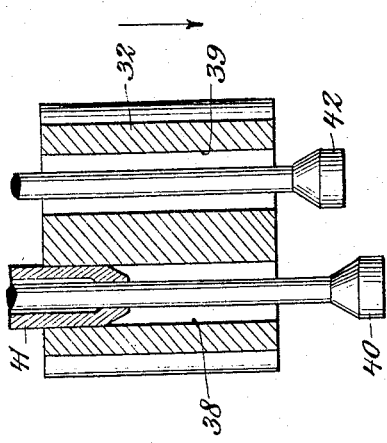
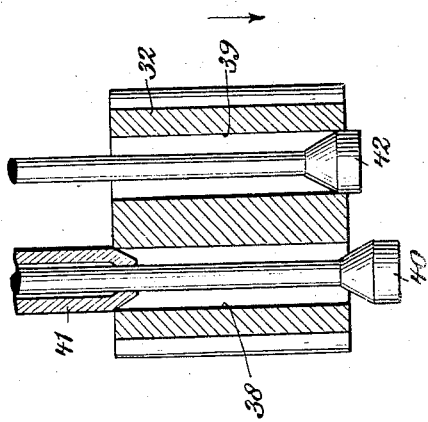
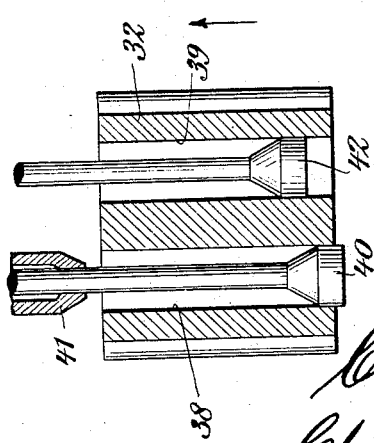

UNITED STATES PATENT OFFICE.

CLARK W. PARKER, OF SPRINGFIELD, MASSACHUSETTS, ASSIGNOR TO PARKER TRANSMISSION AND APPLIANCE COMPANY, OF SPRINGFIELD, MASSACHUSETTS, A CORPORATION OF MASSACHUSETTS.

MEANS FOR CONTROLLING AND REGULATING THE OPERATION OF CLUTCHES.

1,055,071.   Specification of Letters Patent.   Patented Mar. 4, 1913.

Application filed December 28, 1910. Serial No. 599,690.

*To all whom it may concern:*

Be it known that I, CLARK W. PARKER, a citizen of the United States of America, and a resident of Springfield, county of Hampden, and State of Massachusetts, have invented certain new and useful Improvements in Means for Controlling and Regulating the Operation of Clutches, of which the following is a specification, reference being had to the accompanying drawings, forming a part thereof.

In the type of friction disk clutch commonly employed for connecting the engine with the mechanism to be driven in motor car construction, such clutch is usually released by means of pressure applied by the foot to a pedal lever against the action of a powerful spring, and is applied by the reaction of the said spring when the pedal is released. If such pedal be released too quickly, as is quite common, the result is a too sudden application of the clutch by which the parts are subjected to considerable shock. Again the clutch should, and in many cases to-day must, be released whenever the transmission change speed gearing is operated to change the driving connection from one speed to another, or from one direction to another. With these ends in view I have designed a means for retarding the operative engagement of the clutch so that no matter how quickly the operating lever may be released by the operator in a clutch operating movement, the operation of connecting the clutch will be retarded to a predetermined extent. I have also provided means whereby, the clutch operating means is retarded to different degrees throughout its movement.

In order that my invention may be fully understood I will now proceed to describe a structure constituting an embodiment thereof, having reference to the accompanying drawings illustrating the same, and will then point out the novel features in claims.

In the drawings: Figure 1 is a view in central longitudinal section through a clutch and clutch operating mechanism constructed in accordance with my invention. Fig. 2 is a transverse sectional view therethrough, the plane of section being taken partly upon the line $x$—$x$ and partly upon the line $y$—$y$ of Fig. 1. Fig. 2ª is a detail sectional view showing particularly the adjustable connection of two of the retarding device plungers with the casing. Fig. 3 is a detail view in transverse horizontal section through the retarding or regulating means, the plane of section being indicated by the line 3—3 in Fig. 2. Figs. 4, 5, 6, 7 and 8 are diagrammatic views showing different positions of the retarding or regulating piston with respect to the stationary plungers employed in connection therewith.

As the clutch *per se* forms no part of my present invention I have merely illustrated a conventional form thereof in which the driving shaft 10 carries a cylindrical head 11 having a splined engagement 12 with a set of friction clutch disks 13, while the driven shaft 14 carries a hub 15 so connected thereto as to rotate constantly therewith but to have a limited longitudinal sliding movement thereon, the said hub having a complementary set of clutch disks 16 secured to rotate therewith, the disks of the set 16 alternating with the disks of the set 13.

At its rear end the hub 15 is provided with a flange 17 which constitutes a rear abutment for the clutch disks, while the hub 11 is provided at its front end with a cover 18 which constitutes a complementary abutment at the opposite end of the disks. A powerful helical spring 19 surrounds the driven shaft 14 bearing at one end against a collar 20 thereon, and at the other end against a shouldered portion 21 of the hub 15. The said spring normally exerts its force to move the abutments 17 and 18 toward each other so as to press the friction disks in intimate relative engagement, and as one of the sets of disks is secured to rotate with the drive shaft 10 and the other secured to rotate with the driven shaft 14, it will be understood that such action connects the two shafts together in driving relation. For the purpose of releasing this clutch connection I have provided an operating arm 22, such operating arm conveniently taking the form of a pedal lever as is common in clutch mechanism of this character, the said operating arm being mounted upon a horizontal spindle 23 supported in suitable bearings 24 in a main inclosing casing 25. The spindle 23 carries short arms 26 provided with slotted extremities which engage the trunnions 27 of a ring 28. This ring is secured against relative longitudinal movement with respect to the hub 15 by means of a ball bearing 29, such bearing permitting free rotational movement of the hub within the said ring with a minimum of friction. The portion of the spindle 23 below the shaft 14 and hub 15 is curved in yoke-like form as at 30, to clear the same as will readily be understood by reference to Fig. 2 of the drawings. If the pedal lever 22 be depressed, that is to say, moved in the direction of the arrow in Fig. 1, the hub 15 carrying the abutment 17 will be moved away from the abutment 18, against the tension of the spring 19, to release the clutch disks from frictional engagement with each other, whereby to free the shafts 10 and 14 from their driving engagement, and similarly if the operating arm or clutch pedal 22 be released and permitted to return to its normal position by the action of the spring 19, then the clutch disks will again be brought into intimate engagement with the two shafts, connected together as before.

Secured to the casing at a suitable point beneath the same is a vertical cylinder 31 to which is fitted a piston 32. A piston rod 33 secured at its lower end to the said piston passes through a suitable stuffing box in the upper head 34 of the cylinder, and is pivotally connected at its upper extremity with an arm 35 secured fast to the spindle 23. The piston 32 has a main opening 36 therethrough which is arranged to be closed by means of a spring actuated puppet valve 37, the stem of the said puppet valve being mounted to slide in a yoke which spans the opening 36. The said piston is also provided with two other cylindrical channels or openings 38—39 therethrough, stationary pistons or plungers 40—41 and 42 being arranged for engagement with the two said cylindrical channels, the pistons or plungers 40—41 with the channel 38 and the piston plunger 42 with the channel 39. The main piston 32 is furthermore provided upon the exterior thereof with a longitudinal groove 44 which also constitutes a channel, the said groove being closed to a greater or less degree by an adjusting screw 45 with which the cylinder 31 is provided. The pistons or plungers 40—42 have reduced stems as shown, while the piston or plunger 41 is hollow and surrounds the stem of the piston or plunger 40. The upper ends of the stems are screw-threaded, the stems of the pistons or plungers 41—42 having a screw-threaded engagement with the casing 25 as at 43, while the stem of the piston or plunger 40 has a similar screw-threaded engagement with the stem of the piston or plunger 41. By this means each of the pistons or plungers may be independently adjusted longitudinally. The cylinder 31 is filled above and below the piston with a liquid, preferably a very light oil.

The relative position of the plungers 40—41 and 42 with respect to the piston 32 when the parts are in their normal rest positions as in Figs. 1 and 2, is shown in the detail view, Fig. 4. When the pedal 22 is depressed to its greatest extent to entirely free the clutch, then the piston is lifted to a point wherein it occupies a relative position with respect to the plungers, such as is shown in Fig. 5, and such lifting movement will be resisted to a minimum degree by the liquid in the cylinder 31 because the puppet valve 37 will open freely during such upward movement of the piston as will be well understood. In this position the channel 38 will be closed by the plunger 41 while the channel 39 will be open, the piston having in its upward movement, moved clear of the heads of the plungers 40 42. If now the pedal 22 be released the action of the spring 19 will cause the parts to move in a direction wherein the piston will be forced downward, and such movement will be a relatively rapid one until the piston 32 has descended to a point wherein the lower end of the opening or channel 39 reaches the plunger head 42 and is closed by it, this position being shown in Fig. 6. Further downward movement of the piston and hence further movement of the parts connected therewith will now be opposed to a greater degree by the liquid in the cylinder 31 because the main opening 36 will be closed by the valve 37, while the cylindrical channels 38 and 39 will be closed by the plungers 41 and 42. The channel 44 will, however, be open to the extent to which the adjustment of the screw stud 45 permits, and this channel will thus form a by-pass through which the liquid may be slowly forced from beneath the piston to a point above it. The parts may therefore move slowly at a rate of speed determined by the adjustment of the screw 45, until the piston reaches a point wherein the channel 38 will be opened, by reason of its moving clear of the plunger 41 as is shown in Fig. 7. The channel 38 now forming a free connection between the upper and lower ends of the piston, the piston may descend more freely for a period, and until the channel 38 is again closed by reaching the head of the plunger 40, as shown in Fig. 8. Thereafter and for the remainder of its travel downward the piston will move slowly until it reaches the bottom of the cylinder 31, at which time it will again occupy the position shown in Fig. 4.

The use of the three plungers 40—41—42 and the two channels 38—39, is, advantageous and desirable in constructions employing the multiple disk type of main clutch. The combination shown and described gives first a period of minimum retardation of return movement; second, a period of greater retardation; third, another period of less retardation; and fourth, another period of greater retardation. During the first period the overthrow movement of the pedal beyond that necessary to actually release the clutch is taken up, then during the first period of greater retardation the clutch is lightly connected in engagement, just with sufficient force to rotate the driven parts under no-load conditions. During the following period of less retardation the clutch parts are brought to a condition just short of actually gripping as occurs under running, full load, conditions, while in the final period of retardation the actual gripping of the clutch is completed gently and without shock. The intermediate period of less retardation is useful in connection with the multiple disk form of main clutch, in permitting a quick enough movement on the whole, so that when changing the driving relation when hill climbing for instance, the momentum of the car will not be lost.

By properly adjusting the relative positions of the plungers the periods of less and greater retardation may be determined as required, and the adjusted position of the screw stud 45 will determine the speed at which the parts move during the period or periods of greater retardation.

What I claim is:

1. The combination with a clutch comprising friction elements having relative movement into and out of frictional engagement, a spring for forcing the elements into frictional engagement, and operating means for moving the elements out of engagement against the action of the spring, of means for automatically retarding the action of the spring, said means resisting the spring to a greater extent during the initial and final movement of the friction elements by the spring and resisting the spring to a lesser extent during an intermediate portion of the movement of said elements by the spring, substantially as and for the purpose described.

2. The combination with a clutch comprising friction elements having relative movement into and out of frictional engagement, a spring for forcing the elements into frictional engagement, and operating means for moving the elements out of engagement against the action of the spring, of a device for automatically retarding the action of the spring, said device having means for effecting a greater resistance to the spring during the operation of the spring to bring the elements into light frictional engagement and to bring said elements into firm gripping relation, and means for effecting a lesser resistance to the spring for a predetermined time after said elements are brought into light frictional engagement, and before they are brought into firm gripping relation, substantially as and for the purpose specified.

3. The combination with a clutch comprising friction elements having relative movement into and out of frictional engagement, a spring for forcing the elements into frictional engagement, and operating means for moving the elements out of engagement against the action of the spring, of means for automatically retarding the action of the spring during the movement of the elements into light frictional engagement and for resisting the spring to a less degree during the bringing of the elements to a condition short of gripping under normal conditions and for finally retarding to a greater extent the action of the spring while said elements are being brought into firm gripping relation, substantially as and for the purpose set forth.

4. The combination with a clutch comprising friction elements having relative movement into and out of frictional engagement, a spring for forcing the elements into frictional engagement, and operating means for moving the elements out of engagement against the action of the spring, of a device for automatically retarding the action of the spring comprising means for permitting relatively rapid movement of the elements by the spring toward their position of light frictional engagement, means for then retarding the action of the spring to bring said elements into light frictional engagement, means for retarding the action of the spring with less resistance immmediately after said elements are brought into light frictional engagement, and means for finally retarding the action of the spring to a greater degree during the movement of said elements into their final gripping relation, substantially as and for the purpose described.

CLARK W. PARKER.

Witnesses:
FRANK E. LADD,
ROBERT RORSING.